United States Patent [19]
Imai et al.

[11] Patent Number: 5,588,608
[45] Date of Patent: Dec. 31, 1996

[54] PRETENSIONER

[75] Inventors: Keisuke Imai; Keiichi Kato; Takayuki Ando; Fuminori Teraoka; Kenji Matsui, all of Aichi-ken, Japan

[73] Assignee: Kabushiki Kaisha Tokai-Rika-Denki Seisakusho, Aichi-ken, Japan

[21] Appl. No.: 294,917

[22] Filed: Aug. 24, 1994

[30] Foreign Application Priority Data

Aug. 30, 1993 [JP] Japan .................... 5-046979 U

[51] Int. Cl.$^6$ .................................. B60R 22/46
[52] U.S. Cl. .......................................... 242/374
[58] Field of Search ................ 242/374; 280/806; 297/478, 480

[56] References Cited

U.S. PATENT DOCUMENTS

| | | | |
|---|---|---|---|
| 4,750,759 | 6/1988 | Escaravage | 280/806 |
| 5,174,409 | 12/1992 | Osawa | 180/274 |

FOREIGN PATENT DOCUMENTS

| | | | |
|---|---|---|---|
| 2548113 | 1/1985 | France . | |
| 2946717 | 6/1980 | Germany . | |
| 3231509 | 3/1984 | Germany | 242/374 |
| 3040667 | 2/1991 | Germany . | |
| 3262760 | 11/1991 | Japan . | |
| 3292239 | 12/1991 | Japan . | |
| 4126665 | 4/1992 | Japan . | |
| 4103453 | 6/1992 | Japan . | |
| 8901430 | 2/1989 | WIPO . | |

*Primary Examiner*—John M. Jillions
*Attorney, Agent, or Firm*—Sixbey Friedman Leedom & Ferguson; Thomas W. Cole

[57] ABSTRACT

A pretensioner is disclosed which, when a vehicle suddenly decelerates, a large quantity of gas is generated, and the gas flows into a cylinder from a gas-generating a device. As a result of pressure of the gas, a movable pulley moves instantaneously together with a piston, so that the wire trained around the movable pulley is pulled. An amount by which a wire is pulled is twice an amount by which a wire is pulled in cases where the wire is directly connected to the piston, as in conventional devices. Accordingly, the wire can be pulled by the same amount by using only half of a length of a conventional cylinder, thus making it possible to manufacture a pretensioner which has a short cylinder.

15 Claims, 3 Drawing Sheets

5,588,608

1

PRETENSIONER

BACKGROUND OF THE INVENTION

1. Field of the Invention

The present invention relates to a pretensioner which is used in a webbing take-up device, and which causes a webbing to be applied closely to a vehicle occupant when a vehicle suddenly decelerates.

2. Description of the Related Art

A seat belt device must insure the safety of a vehicle occupant by tightly restraining the vehicle occupant by a webbing when the vehicle suddenly decelerates.

The pretensioner is designed such that the webbing can be freely taken up or pulled out without any interference with the rotation of the take-up shaft during ordinary running of the vehicle. When the vehicle suddenly decelerates, the take-up rotary force of the pretensioner is transmitted to the take-up shaft of the webbing by a clutch mechanism provided between the take-up shaft and the pretensioner, so that the webbing is taken up in the direction which restrains the vehicle occupant.

The take-up rotary force of such a pretensioner is obtained in the following manner. A gas is fed under pressure into a cylinder so that a piston is caused to move suddenly, thus causing instantaneous rotation of a rotating drum around which a wire, one end of which is connected to the piston, is wound. The rotary force of the rotating drum is transmitted to the take-up shaft of the webbing by the clutch mechanism.

However, in conventional pretensioners equipped with a cylinder and piston, the cylinder must be lengthened in accordance with the amount off rotation of the take-up shaft. Accordingly, the cylinder portion protrudes from the main body of the webbing take-up device, so that a given attachment space must be provided inside the passenger compartment.

SUMMARY OF THE INVENTION

In view of the aforementioned, the object of the present invention is to provide a pretensioner which makes it possible to shorten the length of a cylinder.

A pretensioner relating to the present invention which forcibly rotates a webbing take-up shaft when a vehicle suddenly decelerates and which tenses a webbing in a direction of restraining a vehicle occupant, comprises: a rotating drum connected to an axial end portion off said webbing take-up shaft via a clutch mechanism; a cylinder into which gas, which is generated when the vehicle suddenly decelerates, flows; a piston disposed within said cylinder and receiving gas pressure of the gas which flows in said cylinder; a movable pulley which is axially supported by said piston; and a wire, one end of said wire being wound around said rotating drum, another end of said wire being fixed to a bottom portion of said cylinder, and an intermediate portion of said wire being trained around said movable pulley.

In the pretensioner of the present invention, when the vehicle suddenly decelerates, a large amount of gas is generated and the gas flows into the cylinder. Due to the pressure of the gas, the movable pulley moves instantaneously together with the piston, so that the wire trained around the movable pulley is pulled. The amount by which the wire is pulled is twice the amount by which the wire is pulled in cases where the wire is directly connected to the

2 piston, as in conventional devices. Accordingly, the same amount of wire can be pulled with half the length of a conventional cylinder, thus making it possible to manufacture a pretensioner which has a short cylinder.

Further, since the pressure of the gas is received by the bottom surface of the piston and does not act on the movable pulley, the movable pulley, which is axially supported in slots formed in side walls or the piston, can rotate smoothly without being affected by the gas pressure.

When the wire is pulled, the rotating drum around which the wire is wound rotates, and the rotary force is transmitted to the take-up shaft via the clutch mechanism, so that the webbing is tensed in the direction which restrains the vehicle occupant.

DETAILED DESCRIPTION OF THE PREFERRED EMBODIMENTS

Figure 1:
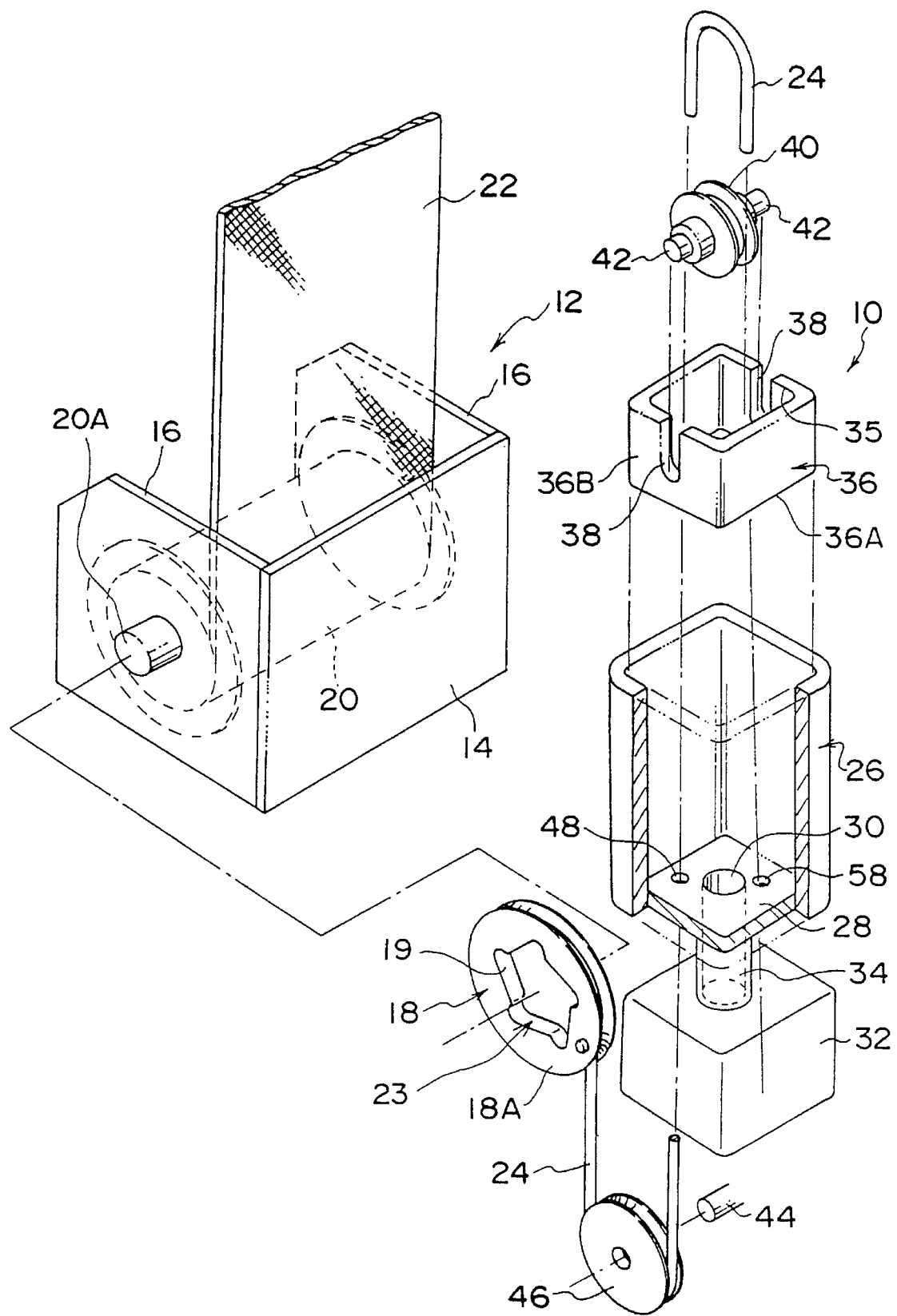
FIG. 1 is an exploded perspective view which illustrates a pretensioner of the present invention.

FIG. 1 shows a webbing take-up device 12 equipped with a pretensioner 10 of the present embodiment. The webbing take-up device 12 has a frame which is formed from a rectangular plate 14 and a pair of leg plates 16 which are bent at right angles from the sides off the plate 14 so as to be parallel to each other.

The leg plates 16 axially support both ends of a take-up up shaft 20 such that the take-up shaft 20 is rotatable. The tip end of a webbing 22 applied to a vehicle occupant is engaged with the take-up shaft 20, and the webbing 22 is wound in a roll form on the take-up shaft 20.

A rotating drum 18 which is positioned on the outside of one of the leg plates 16 is coaxially connected to one end of the take-up shaft 20 via a clutch mechanism 23. A wire 24 is wound around the rotating drum 18, and an end portion of the wire 24 is fixed to the rim portion 18A of the rotating drum 18. When the rotating drum 18 begins to rotate, the clutch mechanism 23 is actuated so that balls 21 are sandwiched between a central shaft 20A of the take-up shaft 20 and narrow-width portions 19A of a cam groove 19 formed at a shaft portion of the rotating drum 18, so that the take-up shaft 20 rotates together with the rotating drum 18.

Further, a cylinder 26 is attached alongside the webbing take-up device 12. The cylinder 26 is a rectangular tube which is open at one end and which has a bottom portion 28 at the other end. A guide passage 34 which communicates with a gas-generating device 32 is connected to a circular hole 30 formed in the bottom portion 28. A gas-generating agent (enhancer or the like) and a detonator, which are not shown in the drawings, are accommodated in the gas-generating device 32. When an acceleration sensor detects the sudden deceleration of the vehicle, the detonator is detonated, and the gas-generating agent is caused to react by the resulting spark so that a large quantity of gas is generated.

Further, a box-shaped piston 36, which has an opening 35 provided at the top and which has a bottom surface 36A, is disposed inside the cylinder 26. Slots 38 are formed along side walls 36B from the opening 35. Shaft portions 42 which protrude from sides of a movable pulley 40 are axially supported in the slots 38 such that the shaft portions 42 are rotatable. An intermediate portion of the wire 24 which is wound around the rotating drum 18 is trained on the movable pulley 40. The direction of movement of the wire 24 is changed by means of a fixed pulley 46 which is axially supported by a shaft 44. The wire 24 is passed through a through-hole 48 formed in the bottom portion 28 of the cylinder 26, and is trained over the movable pulley 40. The wire 24 is then passed through a through-hole 58 formed in the bottom portion 28, and is fastened to the cylinder 26 by a stopper 60 (see FIG. 2).

Next, operation of the pretensioner 10 of the present embodiment will be described.

Figure 2:
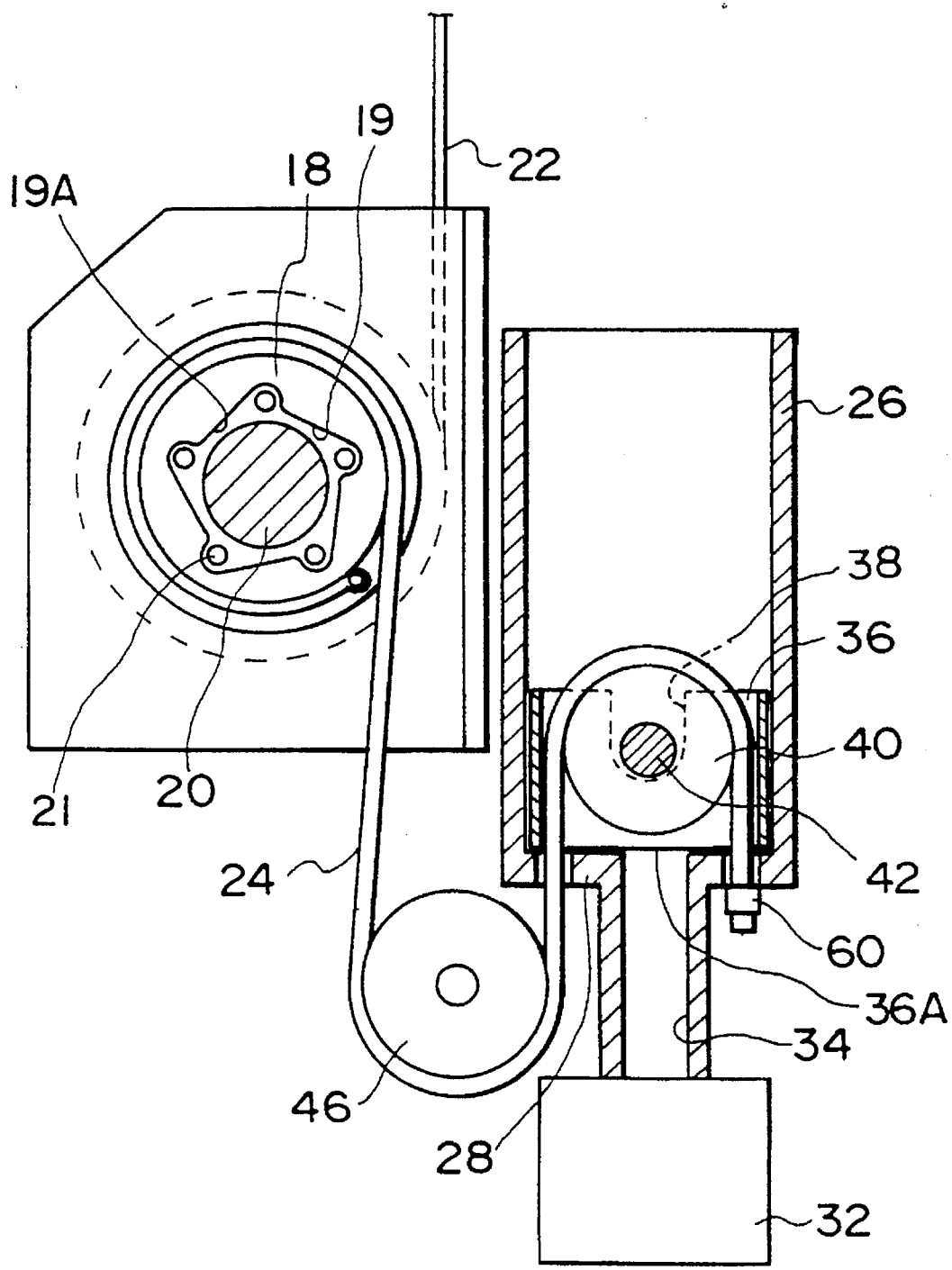
FIG. 2 is a cross section of the pretensioner during normal running of the vehicle.

As is shown in FIG. 2, the piston 36 is positioned at the bottom portion 28 of the cylinder 26 during ordinary running off the vehicle. In this case, the take-up shaft 20 is not connected to the rotating drum 18 by the clutch mechanism. Accordingly, the take-up shaft 20 rotates freely so that the webbing 22 can be taken up or pulled out.

Figure 3:
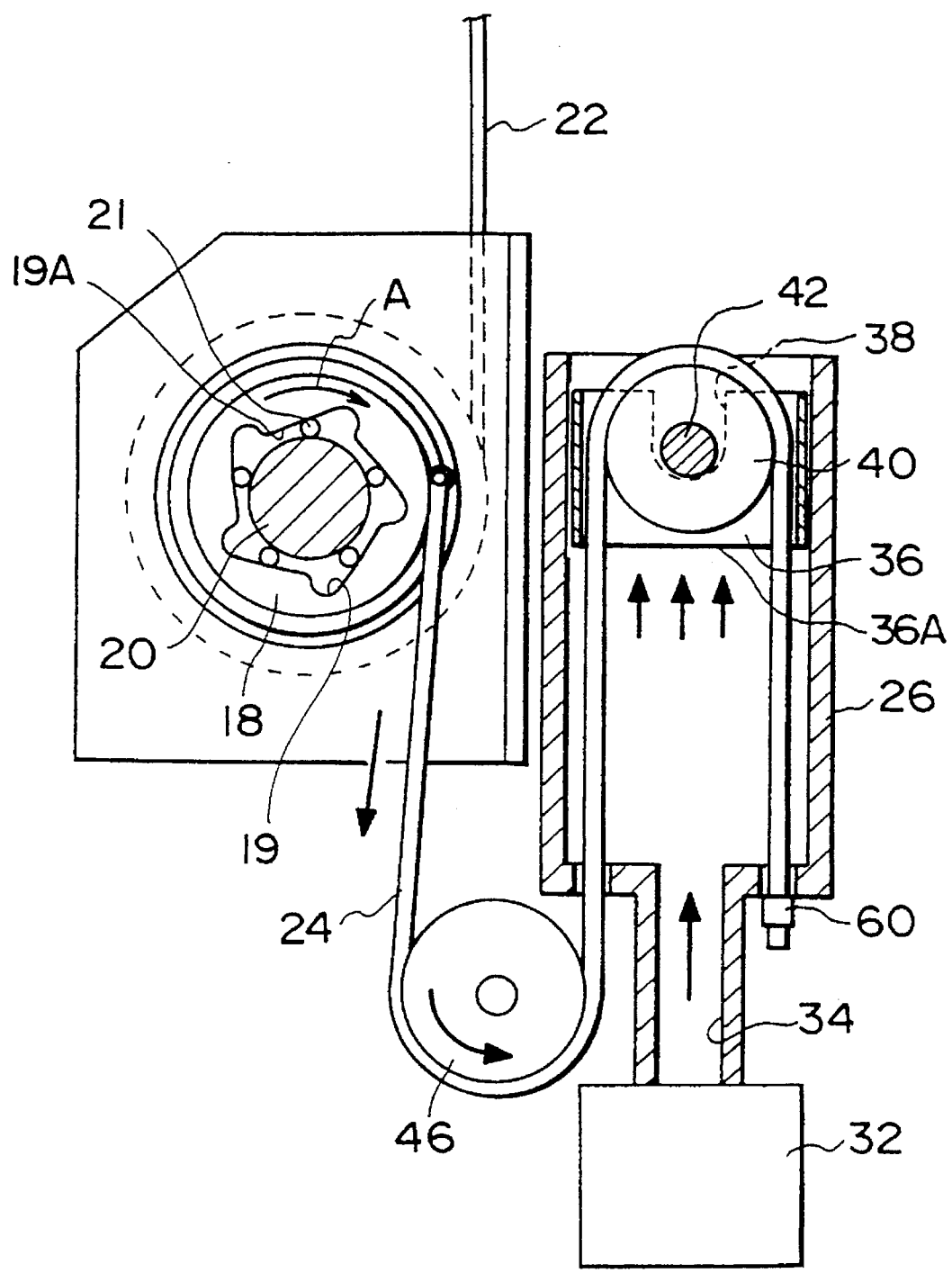
FIG. 3 is a cross section of the pretensioner during sudden deceleration of the vehicle.

When the vehicle suddenly decelerates, the acceleration sensor of the gas-generating device 32 reacts so that the detonator is detonated, and the gas-generating agent is caused to react by the resulting spark so that a large quantity of gas is generated. The gas flows into the cylinder 26 via the guide passage 34 and instantaneously pushes the movable pulley 40 upward together with the piston 36. In this case, since the gas is received by the bottom surface 36A of the piston 36 and does not directly contact the movable pulley 40, the movable pulley 40 can rotate smoothly without being affected by the gas pressure. As a result, the wire 24 is pulled into the cylinder 26 so that the rotating drum 18 rotates in the direction indicated by arrow A in FIG. 3. When the rotating drum 18 rotates, the clutch mechanism is actuated so that the rotary force of the rotating drum 18 is transmitted to the take-up shaft 20, thus causing the take-up shaft 20 to rotate integrally with the rotating drum 18. As a result, the webbing 22 can be forcibly tensed in the direction which restrains the vehicle occupant.

Thus, as a result of the use of the movable pulley 40, the amount by which the wire 24 is pulled in is twice the amount by which the wire 24 is pulled in cases where the wire 24 is directly connected to the piston 36. Accordingly, even in cases where a short cylinder is used, the take-up shaft 20 can be rotated by the same amount as in the case of a conventional long cylinder.

What is claimed is:

1. A pretensioner which forcibly rotates a webbing take-up shaft when a vehicle suddenly decelerates and which tenses a webbing in a direction of restraining a vehicle occupant, comprising:

a rotating drum connected to an axial end portion of said webbing take-up shaft via a clutch mechanism;

a frame including a support plate and a pair of opposing leg plates for rotatably supporting said take up shaft;

a cylinder having sidewalls into which gas, which is generated when the vehicle suddenly decelerates, flows;

a piston having a bottom and sidewalls, and being slidably disposed within said cylinder and, said bottom of said piston receiving gas pressure of the gas which flows into said cylinder to slide within said cylinder;

a movable pulley which is axially, rotatably supported inside of said piston;

a wire, one end of said wire being wound around said rotating drum, another end of said wire being fixed to a bottom portion of said cylinder, and an intermediate portion of said wire being trained around said movable pulley, said wire containing doubled-back portions before and after a portion around said movable pulley, and extending through said bottom of said piston inside said cylinder, said doubled back-portions being parallel with each other, and disposed within said cylinder, a fixed pulley exterior of said cylinder for changing the direction of movement of said wire between said movable pulley and said rotating drum, wherein said sidewalls of said cylinder are mounted adjacent to said frame side by side to each other such that the diameter dimension of said take-up shaft is located within a range of a height of the cylinder for increasing the compactness of said pretensioner, and wherein said parallel portion of said doubled-back portions of said wire nearest to said take-up shaft extends through said cylinder and engages said direction-changing fixed pulley for further increasing the compactness of the pretensioner.

2. A pretensioner according to claim 1, wherein said piston has a box configuration.

3. A pretensioner according to claim 2, wherein an upper surface of said piston is open.

4. A pretensioner according to claim 1, wherein said movable pulley is axially supported in slots formed in said sidewalls of said piston.

5. A pretensioner according to claim 1, wherein said rotating drum and said cylinder are disposed so as to be aligned in a lateral direction.

6. A pretensioner to be used together with a take-up device having a webbing take-up shaft which takes up a webbing adapted to be applied to a vehicle occupant, said pretensioner comprising:

a frame including a support plate and a pair of opposing leg plates for rotatably supporting the take-up shaft of the take-up device;

a cylinder having sidewalls;

a piston having a bottom and sidewalls, and being slidably disposed within said cylinder;

a movable pulley which is axially, rotatably supported inside of said piston;

a flexible elongated body, one end portion of said flexible elongated body being fixed, another end portion of said flexible elongated body being movable, and an intermediate portion of said flexible elongated body being doubled back at said movable pulley to provide doubled back portions and extending through said bottom of said piston inside said cylinder, said doubled back portions being parallel with each other, and disposed within said cylinder;

a drive source which, when a vehicle suddenly decelerates, drives said piston and said double-back intermediate portion of said flexible elongated body and applies tension to said flexible elongated body, so as to move the movable end portion of said flexible elongated body, said drive source having sidewalls;

a clutch interposed between the movable end portion of said flexible elongated body and the take-up shaft of the take-up device, and when the vehicle suddenly decelerates, said clutch transmits moving force of the movable end portion to the take-up shaft so as to rotate the take-up shaft in a direction of taking up the webbing;

a fixed pulley exterior of said cylinder for changing the direction of movement of said elongated body between said movable pulley and said movable end portion of the flexible elongated body;

wherein said sidewalls of said cylinder are mounted adjacent to said frame side by side to each other such that the diameter dimension of said take-up shaft is located within a range of a height of the cylinder for increasing the compactness of said pretensioner, and wherein said parallel portion of said doubled back portions of said body nearest to said take-up shaft extends through said cylinder and engages said direction-changing fixed pulley to further increase the compactness of the pretensioner.

7. A pretensioner according to claim 6, wherein said drive source is provided with said cylinder to which a pressurized fluid is supplied.

8. A pretensioner according to claim 6, wherein said one end portion of said flexible elongated body is fixed to a portion of said cylinder.

9. A pretensioner according to claim 8, wherein said parallel portion of said flexible elongated body nearest to the take-up shaft passes through a bottom wall of said cylinder to an exterior of said cylinder.

10. A pretensioner according to claim 8, wherein said intermediate portion of said flexible elongated body between said clutch and a portion of said flexible elongated body which passes through said cylinder is doubled back so as to be trained around said fixed pulley.

11. A pretensioner according to claim 10, wherein said intermediate portion of said flexible elongated body between said clutch and said fixed pulley is substantially parallel to an intermediate portion of said flexible elongated body between said fixed pulley and said movable pulley within said cylinder.

12. A pretensioner according to claim 6, wherein said cylinder is disposed at a side of the take-up device.

13. A pretensioner according to claim 6, wherein a respective cross-sectional configuration of said cylinder and said piston are polygonal.

14. A pretensioner according to claim 13, wherein said cylinder and piston have respectively a box configuration.

15. A pretensioner comprising:

a take-up shaft which takes up a webbing adapted to be applied to a vehicle occupant;

a frame which axially supports said take-up shaft including a support plate and a pair of opposing leg plates;

gas generating means for generating gas pressure when a vehicle suddenly decelerates;

a cylinder having sidewalls connected to said gas generating means;

a piston having a box configuration and bottom and sidewalls being disposed within said cylinder and being driven by gas;

a flexible elongated body, an intermediate portion of said flexible elongated body extending through said cylinder and said piston to outside of said cylinder, one end of said flexible elongated body being connected to said cylinder;

a clutch coaxially disposed to said take-up shaft and being connected to another end of said flexible elongated body, said clutch connecting operably with said take-up shall due to an increase in tension of said flexible elongated body and transmitting the tension to said take-up shaft so as to rotate said take-up shaft to take up the webbing;

a movable pulley axially supported at said piston, an intermediate portion of said flexible elongated body being trained around said movable pulley, wherein said movable pulley is movable together with said piston by the gas pressure while said pulley is rotated by friction of said flexible elongated body, and consequently said flexible elongated body is pulled out through said bottom of said piston, and said clutch is activated, and wherein said sidewalls of said cylinder are mounted adjacent to said frame side by side to each other such that the diameter dimension of said take-up shaft is located within a range of a height of the cylinder for increasing the compactness of said pretensioner, and wherein a first portion of said flexible elongated body is connected to a bottom wall of said cylinder, and a second portion of said flexible elongated body that is nearer to said frame than said first portion passes through the bottom wall of said cylinder to an exterior of said cylinder and is trained around a stationary rotatable pulley disposed at the exterior of the cylinder that changes the direction of movement of said body for further increasing the compactness of said pretensioner.

* * * * *